(12) United States Patent
Da Ponte et al.

(10) Patent No.: US 6,175,217 B1
(45) Date of Patent: Jan. 16, 2001

(54) HYBRID GENERATOR APPARATUS

(75) Inventors: Manuel Dos Santos Da Ponte, 282 Pleiades Avenue, Waterkloof Ridge, 0181, Pretoria (ZA); Lech Grzesiak, Osikowa (PL); Wlodzimierz Koczara, Chocimska (PL); Pawel Pospiech, Olsztynska (PL); Andrzej Niedzialkowski, Suwalska (PL)

(73) Assignee: Manuel Dos Santos Da Ponte, Pretoria (ZA)

( * ) Notice: Under 35 U.S.C. 154(b), the term of this patent shall be extended for 0 days.

(21) Appl. No.: 09/331,543

(22) PCT Filed: Dec. 19, 1997

(86) PCT No.: PCT/EP97/07273

§ 371 Date: Jun. 18, 1999

§ 102(e) Date: Jun. 18, 1999

(87) PCT Pub. No.: WO98/28832

PCT Pub. Date: Jul. 2, 1998

(30) Foreign Application Priority Data

Dec. 20, 1996 (ZA) .................................................. 96/10787

(51) Int. Cl.[7] .................................................. H02K 29/00
(52) U.S. Cl. .................................. 322/19; 322/28; 322/36; 322/45
(58) Field of Search .............................. 322/7, 8, 10, 19, 322/21, 22, 28, 36, 45

(56) References Cited

U.S. PATENT DOCUMENTS

| 4,697,090 | * | 9/1987 | Baker et al. | 290/4 R |
| 4,908,565 | * | 3/1990 | Cook et al. | 322/10 |
| 5,015,941 | * | 5/1991 | Dhyanchand | 322/10 |
| 5,198,698 | * | 3/1993 | Paul et al. | 307/64 |
| 5,493,200 | * | 2/1996 | Rozman et al. | 322/10 |
| 5,495,162 | * | 2/1996 | Rozman et al. | 322/10 |
| 5,559,685 | * | 9/1996 | Lauw et al. | 363/37 |
| 5,563,802 | * | 10/1996 | Plahn et al. | 364/492 |
| 5,942,818 | * | 8/1999 | Satoh et al. | 310/46 |
| 5,955,809 | * | 9/1999 | Shah | 310/198 |

* cited by examiner

Primary Examiner—Nicholas Ponomarenko
(74) Attorney, Agent, or Firm—Blakely, Sokoloff, Taylor & Zafman

(57) ABSTRACT

A hybrid generator set comprises an engine/generator or another controllable electrical source which provides a variable voltage electrical output, this output is rectified and fed to a DC to DC converter, the output (VDC) of which is monitored by a control circuit. This output serves as an intermediate DC output, which typically is used to power an inverter to generate an AC output which supplies an external load. The use of the DC to DC converter isolates the intermediate DC output from the generator output, and allows the generator set to operate efficiently over a wide engine/generator speed range, according to load demand.

15 Claims, 10 Drawing Sheets

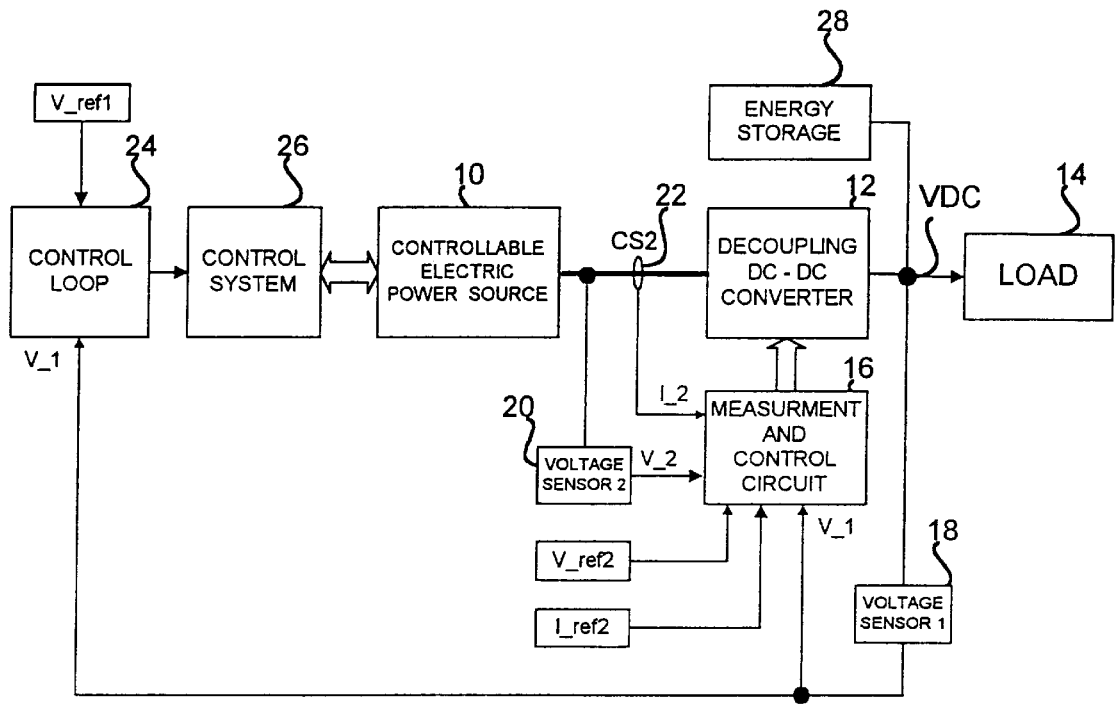
Fig: 1
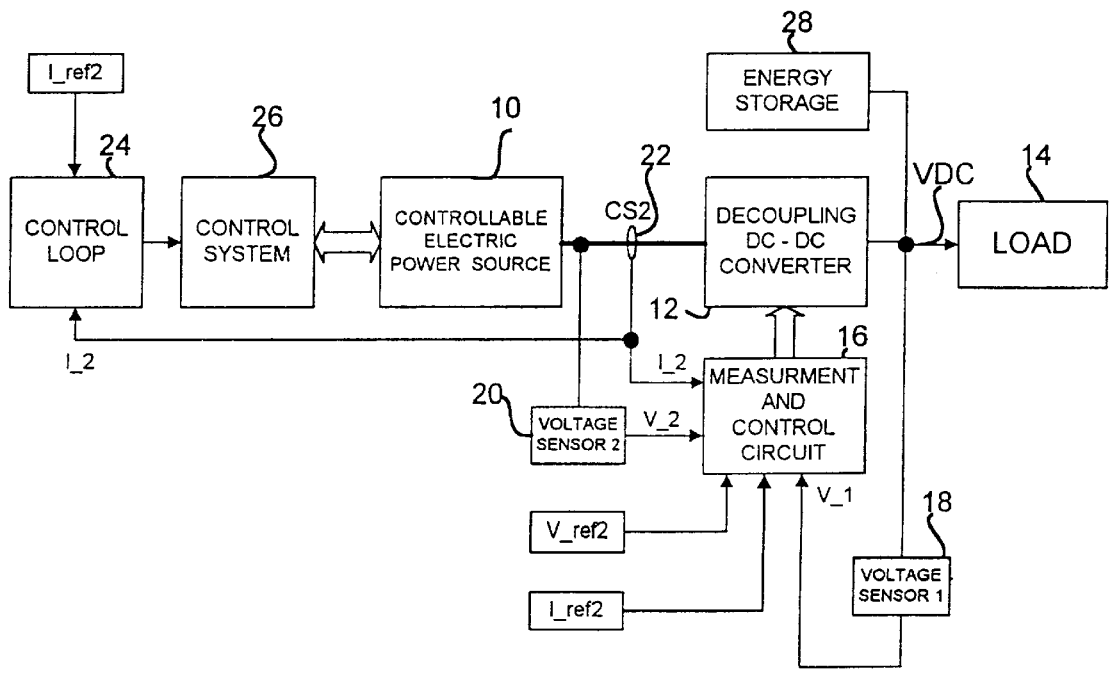
Fig: 2

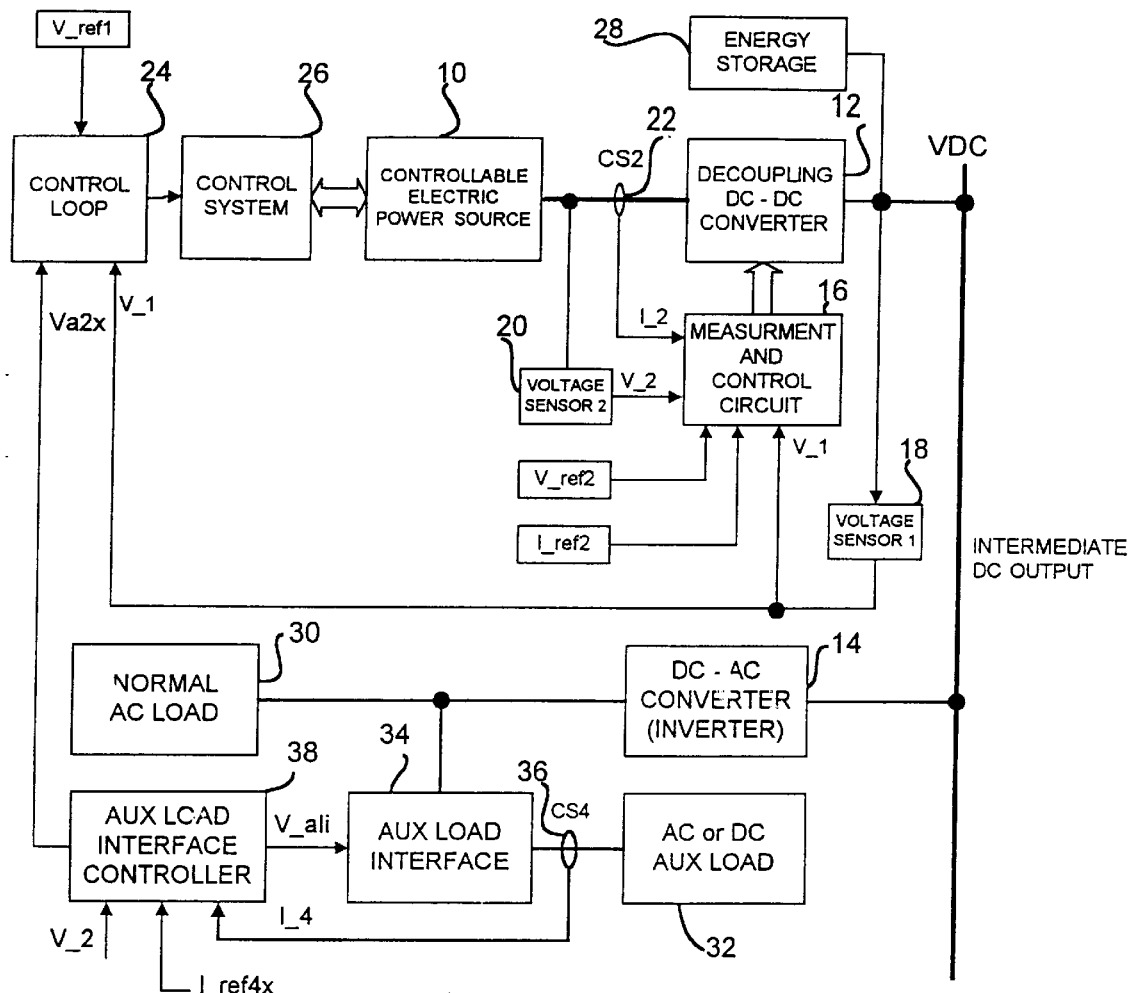
FIG: 3
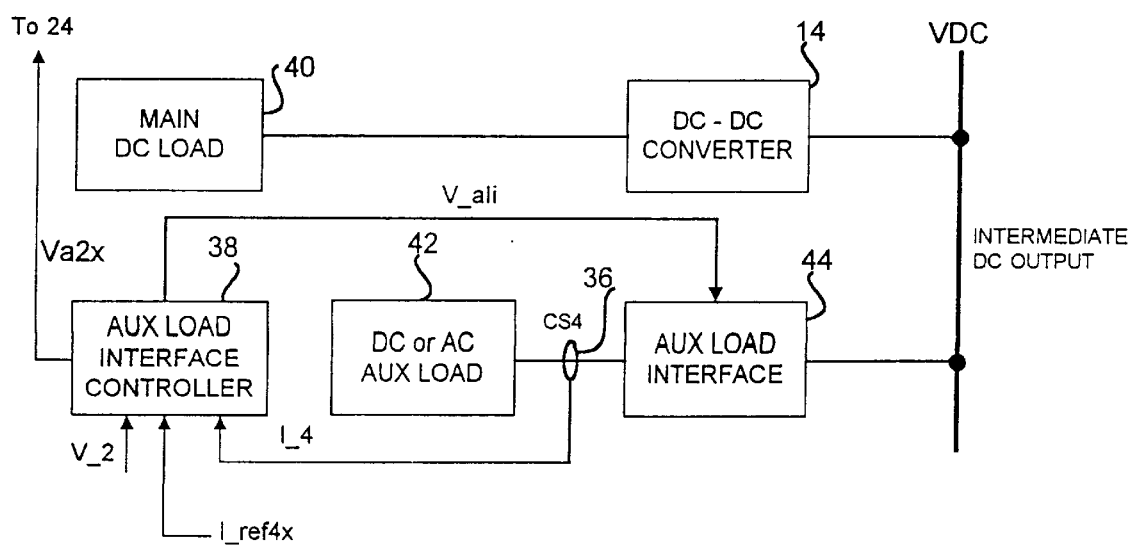
FIG: 4

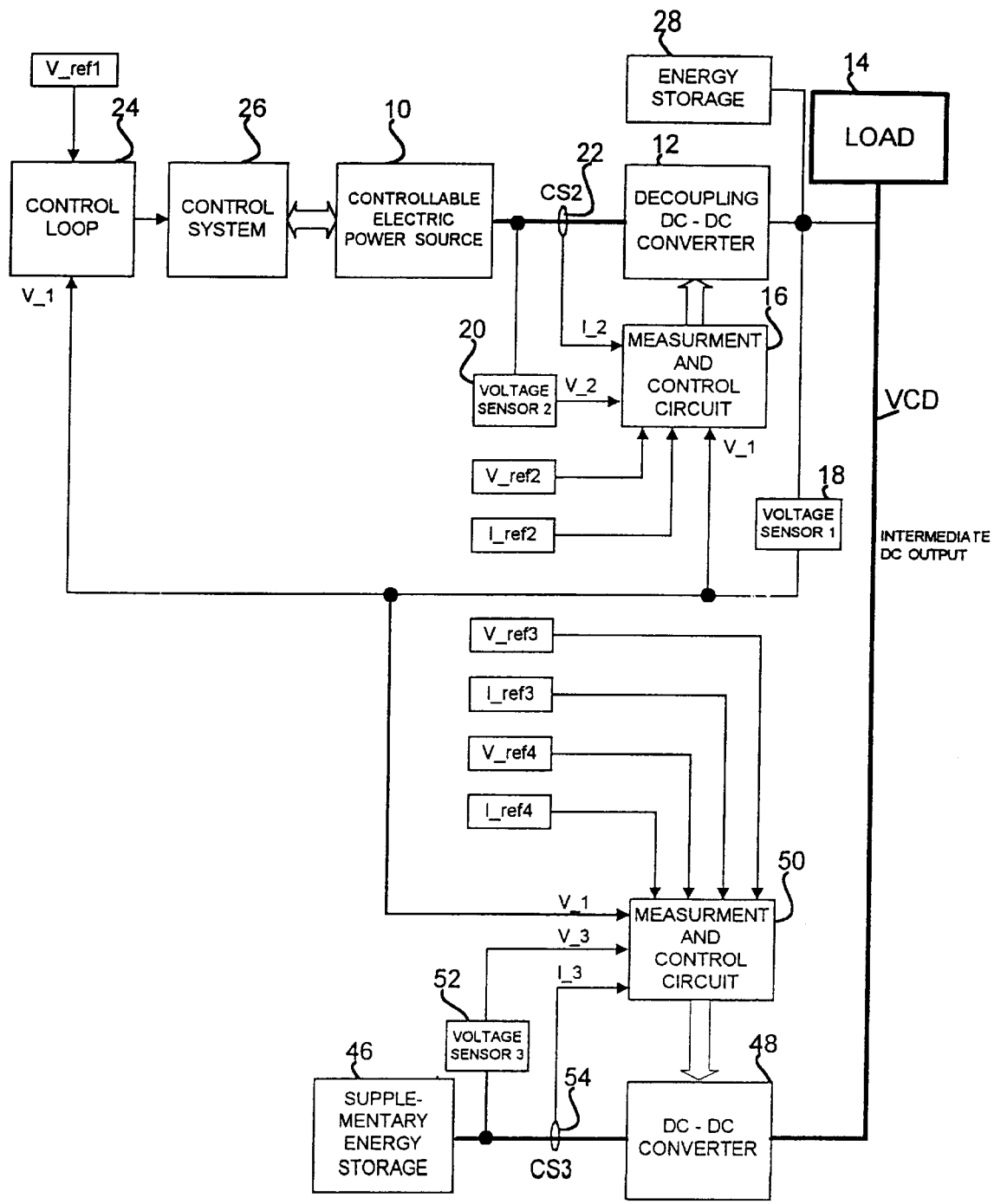
Fig: 5

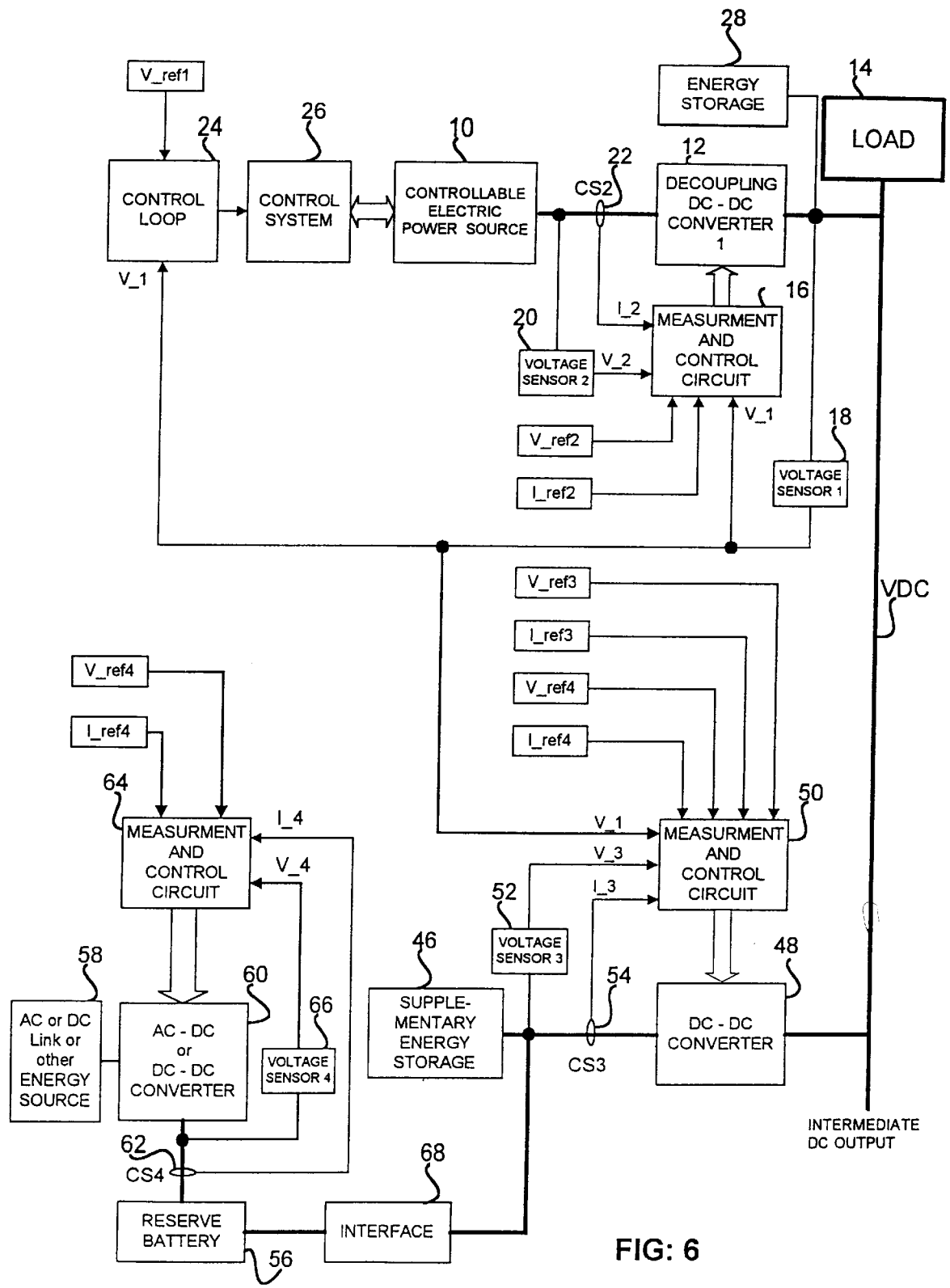
FIG: 6

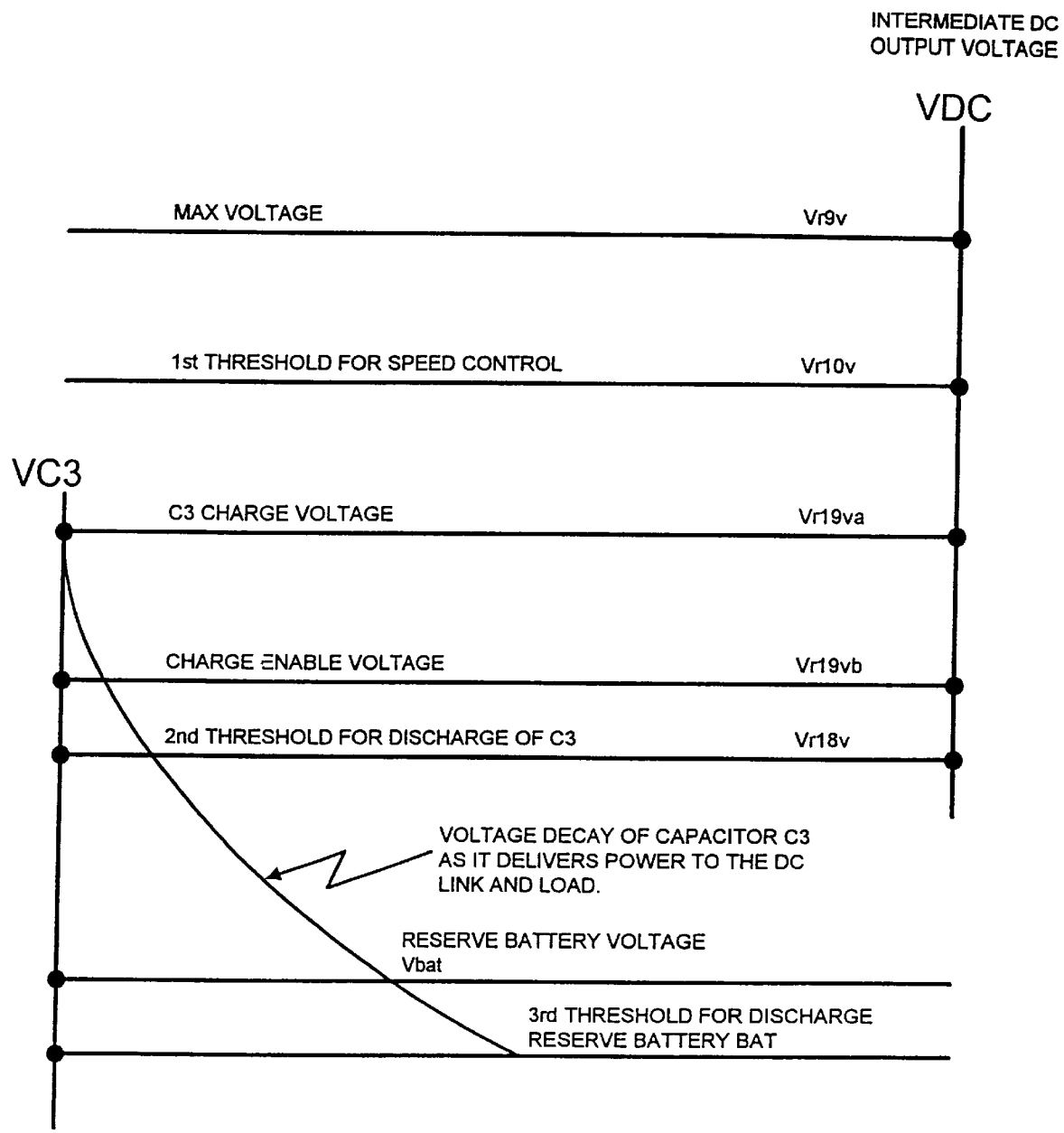
FIG: 7b

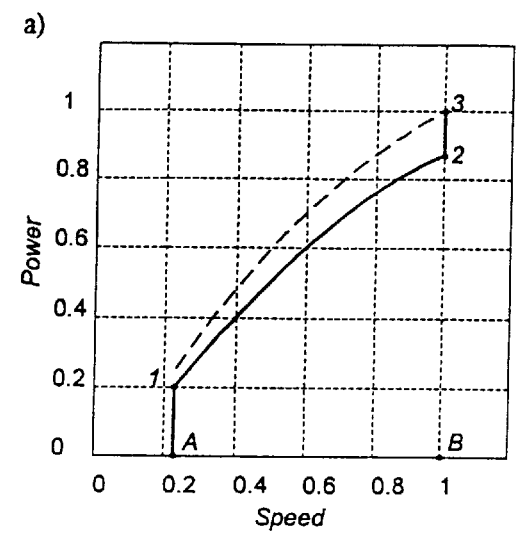
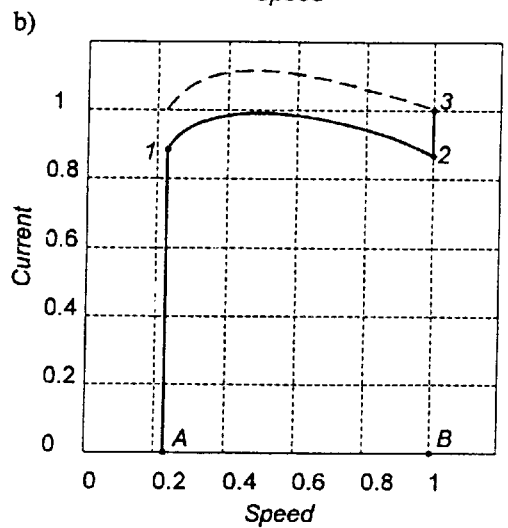
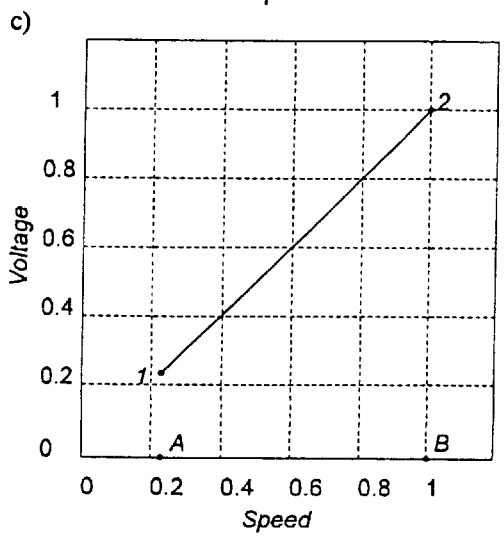
Figure 8.
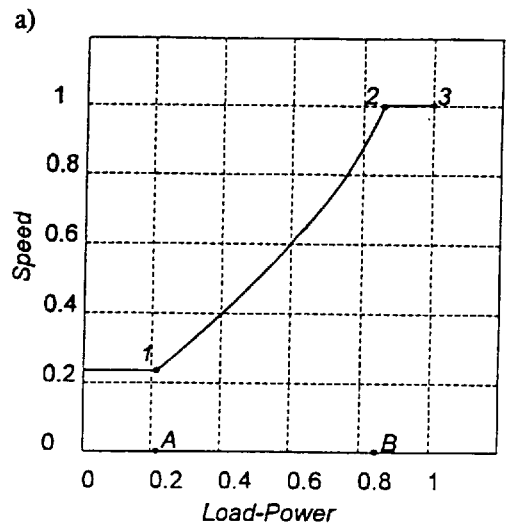
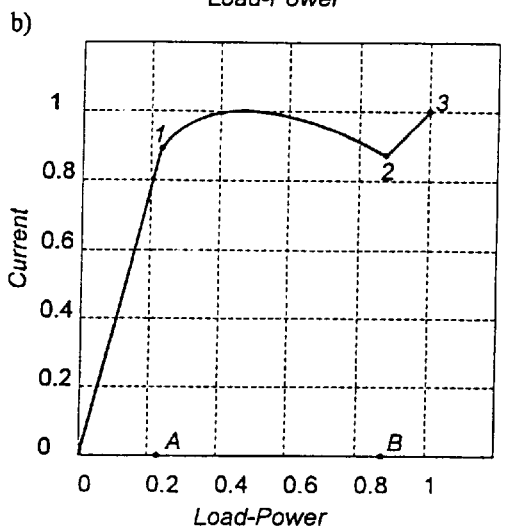
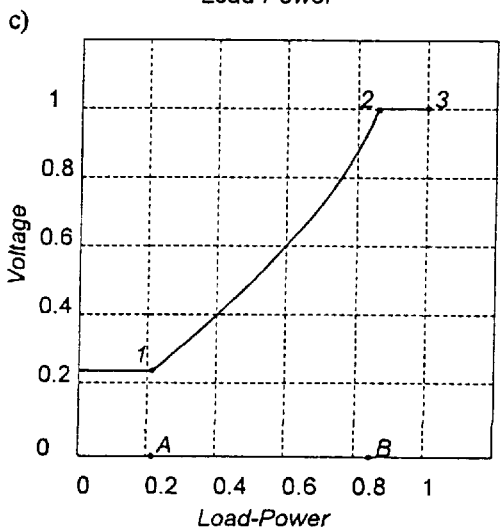
Figure 9.

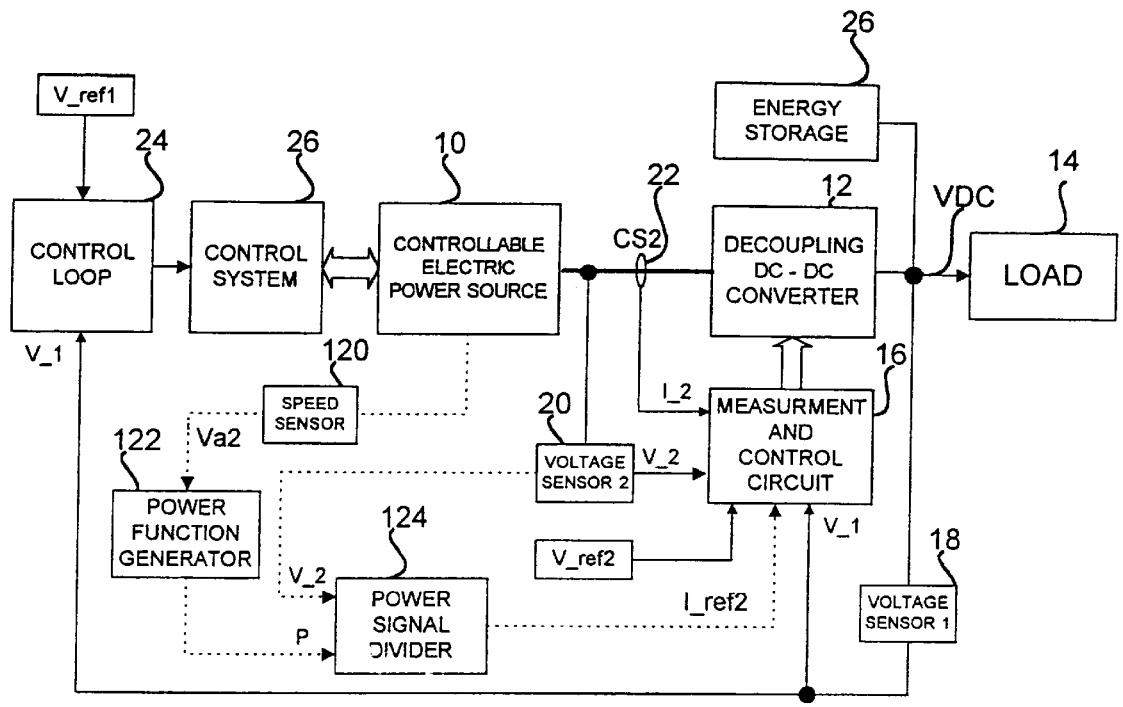
Fig: 10
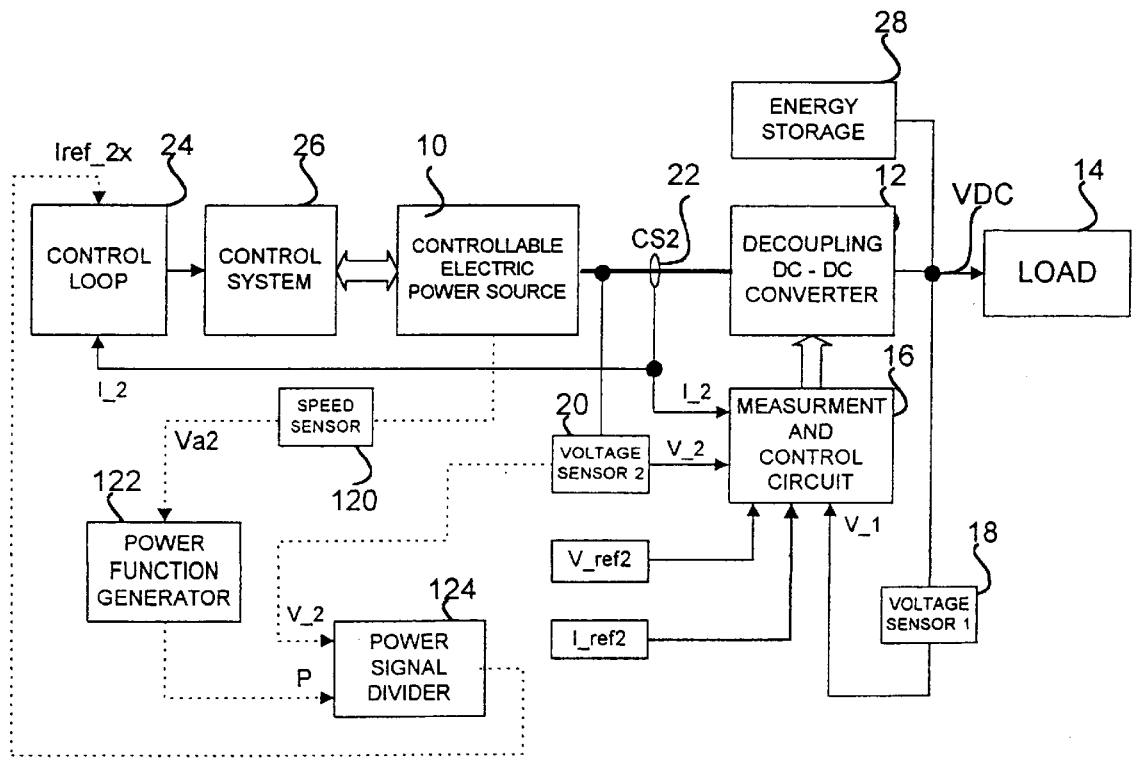
Fig: 11

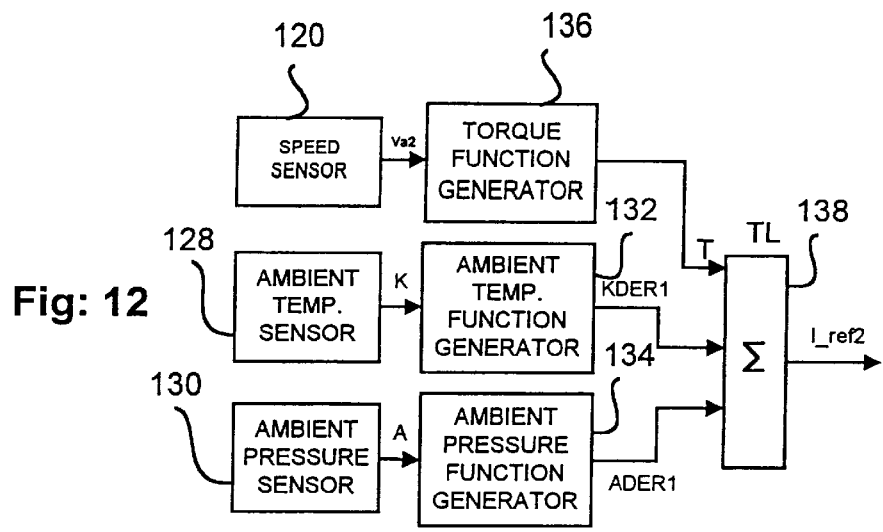
Fig: 12
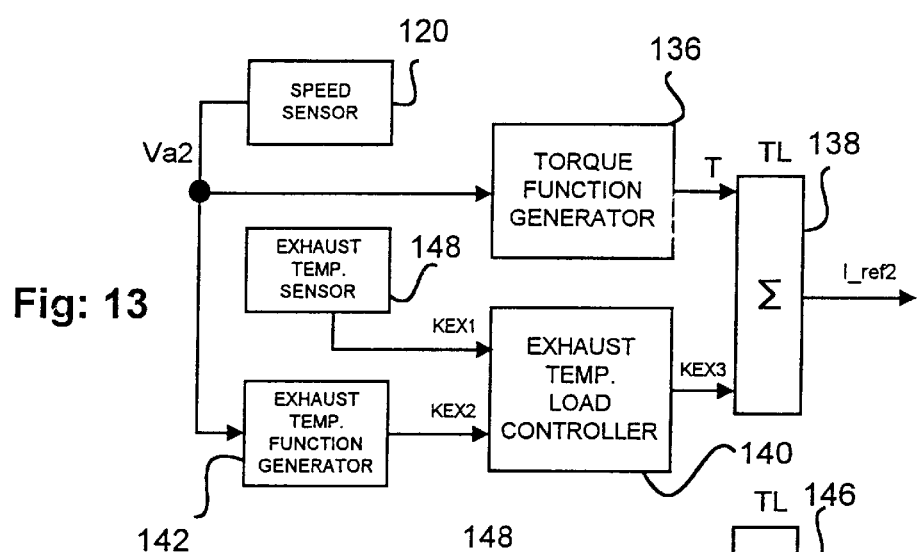
Fig: 13
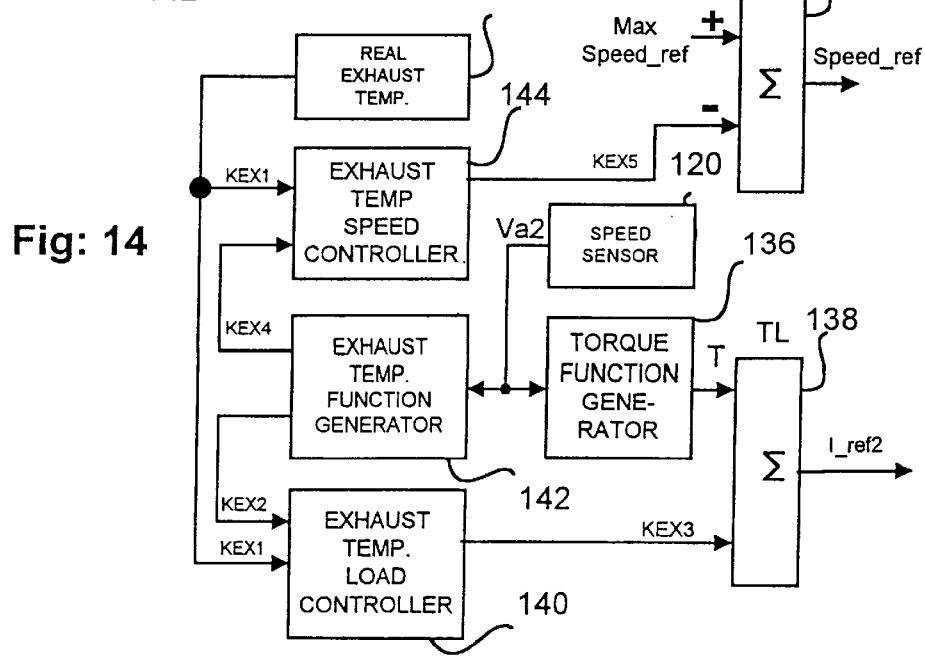
Fig: 14

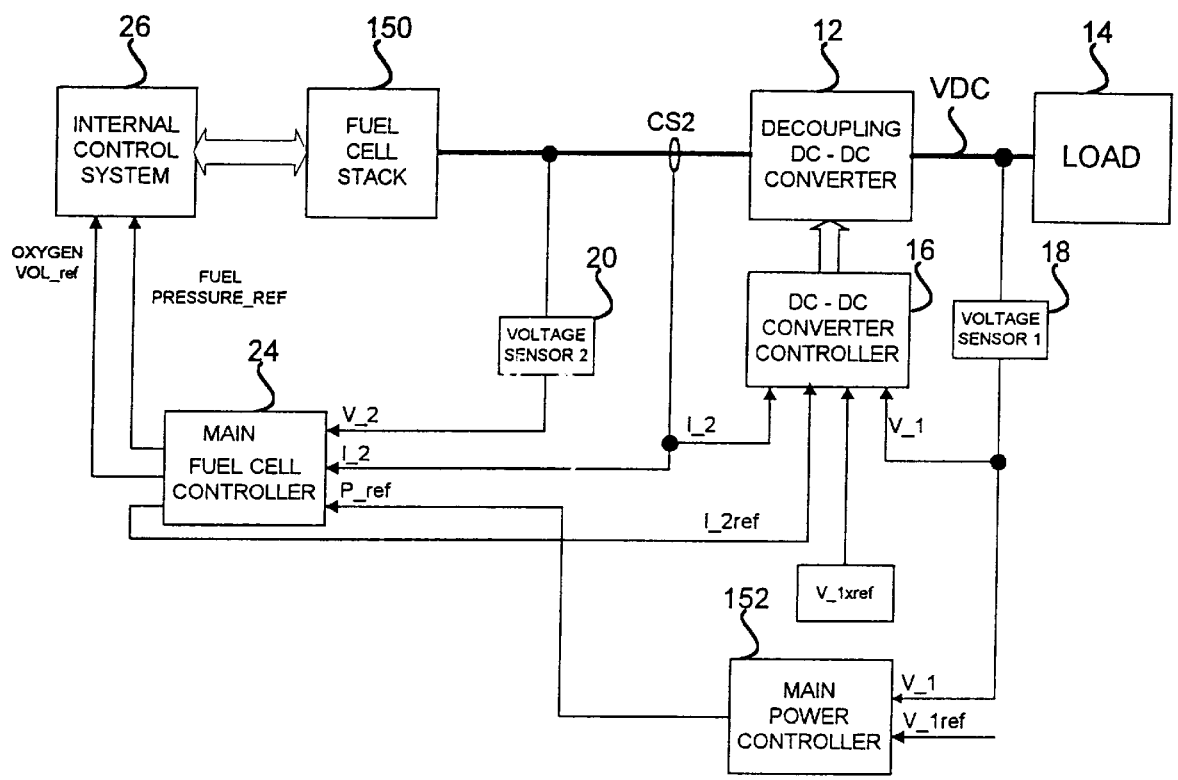
FIG: 15

HYBRID GENERATOR APPARATUS

BACKGROUND OF THE INVENTION

THIS invention relates to generator apparatus which can be used to supply loads which vary substantially with time.

In conventional electric generator sets an engine or other prime mover drives a synchronous alternator at a nominally constant speed which is calculated to provide an AC electrical output of the correct frequency. In practice, the engine speed does not remain exactly constant, with a resultant undesirable variation in the frequency of the electrical output of such generator sets.

In order to supply maximum load demand, such a generator set must be sized accordingly, which can be very wasteful due to the fact that the average load may typically be only 20% of the peak load. There are numerous applications, such as welding, battery charging and the starting/operation of electric motors where load demand may vary greatly, with only intermittent heavy loading of the generator set. Thus, it is desirable that a generator set which is used in such applications be able to cope efficiently with light load conditions.

Variable speed generator sets have been proposed (see, for example, U.S. Pat. No. 5,563,802 of Plahn et al) which respond to variations in load demand by varying the speed of the engine/generator, and which utilise batteries to supply the load under low-load conditions. However, known systems of this kind have various limitations, including a limited engine speed operating range, poor battery life due to onerous duty cycles, and poor performance under adverse load conditions.

It is an object of the invention to provide hybrid generator apparatus which can cope with substantial variations in load while also operating efficiently.

SUMMARY OF THE INVENTION

According to the invention power supply apparatus comprises:

at least one controllable source arranged to provide a variable voltage and/or current electrical output;

decoupling converter means for generating an intermediate DC output from the variable voltage and/or current electrical output of said at least one controllable source which is substantially independent of variations in the electrical output of the source;

output means for generating an AC or DC output to supply a time varying load from the intermediate DC output;

sensor means for monitoring the voltage and/or current of said at least one controllable source and the intermediate DC output and for generating output signals corresponding thereto; and control means responsive to the output signals to control the operation of said at least one controllable source, to dynamically vary the power output of the source and thereby to supply the power required by the time varying load.

The controllable source may comprise a fuel cell or another device such as a hydro-electric generator, a wind turbine, a gas turbine/generator or any other device which generates an electrical output from a non-electrical input.

Alternatively the controllable source may comprise an engine and a generator which provides a variable voltage output to the decoupling converter means.

Preferably, the generator is an AC generator which provides a variable voltage, variable frequency AC output to the decoupling converter means, the apparatus including rectifier means for rectifying the AC output of the generator and the decoupling converter means comprising a DC to DC converter for converting the rectified AC output to an intermediate DC output having a voltage which is controlled with respect to a reference voltage.

The control means may include sensor means arranged to monitor the loading of the intermediate DC output of the converter means and/or the controllable source, and to increase the speed of the engine when the loading exceeds a predetermined value.

In one embodiment, the control means operates to maintain the current drawn from the controllable source at a predetermined level or within a predetermined range, the sensor means comprising a voltage sensor arranged to monitor the output voltage at the intermediate DC output of the converter means, and to increase the speed of the engine to increase the power supplied to the converter means when the voltage of the intermediate DC output drops below a first voltage threshold.

In another embodiment, the control means operates to maintain the voltage of the intermediate DC output substantially constant, the sensor means comprising a current sensor arranged to monitor the current drawn from the controllable source and to increase the speed of the engine to increase the power supplied to the convertor means when the current drawn from the controllable source exceeds a first current threshold.

The apparatus may include at least first energy storage means arranged to be charged from the intermediate DC output and to discharge energy into the intermediate DC output when the voltage of the intermediate DC output falls below a nominal value.

Alternatively or in addition, the apparatus may include auxiliary load control means arranged to detect the connection of an onerous auxiliary load to the output means and to control the supply of power to the auxiliary load, thereby to prevent excessive loading to the output means.

Preferably, the apparatus includes at least second energy storage means, a charge circuit arranged to charge the second energy storage means from the intermediate DC output of the converter means, and a discharge circuit arranged to discharge the second energy storage means in parallel with the first energy storage means when the intermediate DC output voltage drops below a second voltage threshold below the first voltage threshold.

In one embodiment, the apparatus includes third energy storage means, a charge circuit arranged to charge the third energy storage means from an electrical source, and auxiliary converter means arranged to discharge the third energy storage means in parallel with the first and second energy storage means after the second energy storage means has discharged at least partially.

The first and second energy storage devices are preferably capacitors, and the third energy storage device is preferably a battery.

The apparatus may include a speed sensor for monitoring the speed of the engine/generator and for generating a speed output signal related thereto, and function generator means for generating a power signal from the speed output signal, the power signal being representative of a power/speed characteristic of the engine and being utilised by the control means to optimise the operation of the engine.

The apparatus may further include ambient pressure and temperature sensors for monitoring ambient pressure and temperature and for generating respective pressure and temperature output signals, and may further include respective pressure and temperature function generators for generating outputs comprising engine derating characteristics to compensate for variations in ambient operating pressure and temperature.

The apparatus may also include an exhaust temperature sensor arranged to monitor the engine exhaust temperature and to generate an exhaust temperature output signal, an exhaust temperature function generator for generating an exhaust temperature/speed-load characteristic signal from the speed output signal, and a controller for generating an error signal from the difference between the exhaust temperature output signal and the exhaust temperature/speed-load characteristic signal, thereby to compensate for factors affecting the engine exhaust temperature.

BRIEF DESCRIPTION OF THE DRAWINGS

FIG. 1 is a highly simplified block diagram of hybrid generator apparatus according to the invention, utilising a voltage control scheme;

FIG. 2 is a similar diagram to that of FIG. 1, showing a version of the apparatus employing a current control scheme;

FIG. 3 shows the apparatus of FIG. 1 with output circuitry thereof, including a load anticipation circuit, illustrated in more detail;

FIG. 4 shows an alternative output circuit of the apparatus;

FIG. 5 shows a version of the apparatus of FIG. 1 including first and second energy storage devices;

FIG. 6 shows a version of the apparatus similar to that shown in FIG. 5 but including a third energy storage device;

FIG. 7b is a diagram showing the relationship between various thresholds and reference voltages in the control system of the apparatus of FIG. 7a;

FIGS. 8a to 8c and 9a to 9c are graphs illustrating the performance of an embodiment of the apparatus of the invention;

FIGS. 10 and 11 show further variations of the apparatus, utilising more sophisticated voltage and current control loops, respectively;

FIGS. 12, 13 and 14 are schematic diagrams showing additional control circuitry usable with apparatus of the invention to optimise its operation; and FIG. 15 is a block diagram illustrating a control loop for an embodiment of the invention employing a fuel cell as a controllable electrical source.

DESCRIPTION OF EMBODIMENTS

Figure 7A:
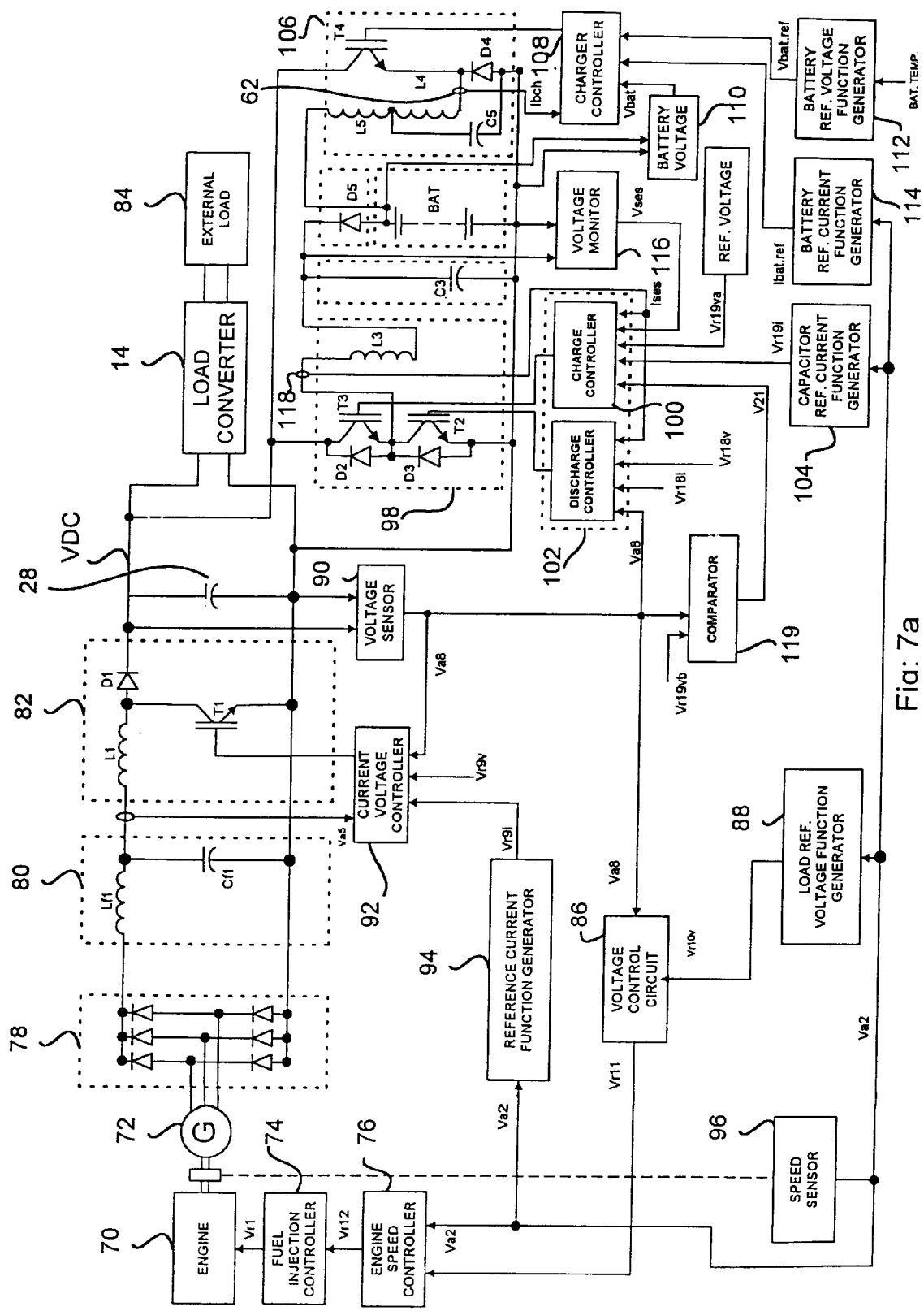
FIG. 7a is a detailed schematic diagram of a preferred embodiment of the invention, comprising a permanent magnet AC generator driven by an internal combustion engine.

FIG. 1 shows the arrangement of hybrid generator apparatus according to the invention in a highly simplified block diagram form. A controllable electrical source 10, which could comprise an engine/generator, a fuel cell, a solar electric system, a hydro-electric generator, a wind turbine or another source of electrical energy which can be controlled to vary its output is connected to decoupling converter means comprising a DC to DC converter 12. The output of the DC to DC converter is referred to herein as an intermediate DC output, having a voltage VDC. This intermediate DC output is applied to a "load" 14 which, in most embodiments, is an output converter means such as an inverter which converts the intermediate DC output to an AC waveform for supplying an external load. However, in other cases the external load may be a DC load, or a vehicle motor, for example.

The decoupling converter means 12 serves the important function of decoupling or isolating the intermediate DC output from fluctuations in the current and/or voltage output of the source 10 so that the control scheme of the apparatus is able to accommodate substantial variations in the output of the source 10. For example, where the source 10 is an engine/generator set, the decoupling effect of the decoupling converter means 12 permits operation of the engine/generator over a wide speed range while maintaining the intermediate DC output within desired operating parameters. The converter means 12 also serves to decouple or isolate the source from variations in the load.

The decoupling converter means 12 can take various forms, depending on the nature of the controllable electrical source 10. Where the output of the source is a DC output, the decoupling means is conveniently a DC to DC converter. In the case of a source 10 with an AC output, an AC to DC converter could be used. Essentially, the decoupling converter means 12 forms a converting function, accepting a widely varying electrical output from the source 10 and generating the intermediate DC output therefrom according to control signals from a measurement and control circuit.

In FIG. 1, the measurement and control circuit is identified by the reference numeral 16. This circuit can comprise an analog or digital circuit, and can readily be implemented utilising a microprocessor running under the control of appropriate software. However, for purposes of the following description, reference is made to a measurement and control "circuit".

A first voltage sensor 18 monitors the value of the intermediate DC output VDC, generating a voltage signal $V\_1$ which is fed to the measurement and control circuit 16. A second voltage sensor 20 measures the voltage output of the source 10 and generates a second voltage signal $V\_2$ which is applied to the measurement and control circuit 16. Additionally, a current sensor 22 measures the current output of the source to the DC to DC converter 12 and generates a current signal $I\_2$ which is applied to the measurement and control circuit 16. The circuit 16 is also supplied with voltage and current reference signals $V\_{ref2}$ and $I\_{ref2}$, respectively.

The output $V\_1$ of the voltage sensor is also applied to a control loop 24 which has a reference voltage $V\_{ref1}$ applied thereto, and which generates an electrical output signal which is applied to a control system 26 of the source 10. Depending on the nature of the source, the control system 26 might be a fuel injection controller of an internal combustion engine or a controller which controls gas (eg. hydrogen and oxygen) flow in a fuel cell, for example.

The apparatus of FIG. 1 includes an energy storage device indicated generically by the reference numeral 28, which is connected to the intermediate DC output of the circuit. In a simple version of the invention, the energy storage device 28 may comprise a capacitor simply connected in parallel with the intermediate DC output, to provide a short term energy reserve when the load applied to the intermediate DC output varies suddenly. In more sophisticated embodiments (see below) the energy storage device 28 may be supplemented by one or more different energy storage devices, with respective control systems.

The apparatus of FIG. 1 operates with a voltage control loop, which is arranged so that the decoupling DC to DC converter 12 effectively regulates the voltage VDC of the intermediate DC output with a maximum voltage according to the reference voltage V_ref2, so that the value of VDC is adjusted by the control loop according to the reference, irrespective of a varying input voltage from the source 10.

At the same time, in this mode of operation, the converter 12 controls the current which it passes according to the current reference I_ref2 so that the source 10 is loaded optimally. For example, in the case of an engine/generator set, when the engine/generator is operating within its variable speed range, the engine is loaded according to a desired curve which approximates an optimum power/speed characteristic of the engine. When the load power demand increases suddenly, the current control applied by the converter 12 prevents the increased load power demand being supplied by an increase in the current drawn from the source. This effectively means that the intermediate DC output is starved of power, causing the load to draw energy directly from the energy storage device 28 which augments the intermediate DC output. As energy is drawn from this device, the output of the device and hence the voltage VDC of the intermediate DC output will fall.

When the value of VDC as detected by the first voltage sensor 18 falls below a first voltage threshold, the resultant input signal V_1 applied to the control loop 24 and the control system 26 controls the source 10 to increase its power output. In the case of an engine/generator, the control system 26 will increase the speed of the engine, resulting in a corresponding increase in the output voltage of the generator. This increase in voltage increases the power supplied to the converter 12 and hence enables the converter to supply higher power to the intermediate DC output without exceeding the source current set by the reference I_ref2. The source 10 thus satisfies the load and recharges the energy storage device 28. The voltage VDC of the intermediate DC output rises until it is restored to the voltage threshold determined by the voltage reference signal V_ref1, and the source 10 will stabilise at the new, higher level of output power.

When the load power demand decreases, the balance between the source and the load will again be disturbed. In this case, the voltage VDC will rise, and the voltage/speed control loop will operate to reduce the output power of the source (eg. the engine speed in the case of an engine/generator set), reducing the output power and voltage of the source and accordingly allowing the converter 12 to reduce its output voltage back to its nominal value.

In the above described mode of operation, a form of current control is used in conjunction with the main voltage control scheme. By controlling or limiting the current drawn from the source, the voltage VDC of the intermediate DC output is caused to vary with variations in load demand, within a predetermined window of voltage variation permitted by the converter 12 and its control circuit 16. The size of this "window" will be determined in practice by, inter alia, the performance parameters of the load converter 14, the energy storage capacity of the energy storage device 28 and the dynamic response of the electrical source 10 to its control system 26.

The apparatus of FIG. 2 is substantially similar to that of FIG. 1, except that the control scheme employed is primarily a current control scheme, rather than a voltage control scheme. According to the current control scheme, the converter 12 operates to regulate the voltage VDC of the intermediate DC output according to a reference voltage V_ref2 so that the value of VDC is maintained substantially constant irrespective of variations in the input voltage to the converter 12.

When the load power demand (the product of the DC voltage and DC current at the intermediate DC output) increases, the current in the converter and hence the current supplied by the source 10 must also increase as VDC is regulated to remain substantially constant. The converter 12 permits the current to increase or decrease according to the load power demand, within the boundaries of safe operation.

When the value of the load increases, and due to the VDC being maintained substantially constant, the converter 12 attempts to supply the load by demanding more current from the source 10. The current sensor 22 detects this increase, generating an output signal I_2 which is applied to both the measurement and control circuit 16 and the control loop 24. Via the control system 26, the control loop 24 adjusts the output of the source 10 to increase its power output. For example, in the case of an engine/generator set, the engine speed is increased, increasing the output voltage and power of the generator. The increase in voltage output of the source causes the converter 12 to reduce its voltage step-up ratio. As the input voltage rises, the input current of the converter 12 will decrease until it is restored to the current threshold determined by the current reference signal I_ref2 and the source 10 will stabilise at its new output power (in the case of an engine/generator the engine will stabilise at its new, higher speed).

Conversely, when the load power demand decreases, the converter 12 will demand less current from the source. When the current value decreases below the predetermined threshold set by I_ref2, the power output of the source is reduced (eg. the engine speed of an engine/generator set is reduced). The corresponding decrease in the source output voltage will cause the current drawn from the source to increase. When the current is restored to the value determined by the current reference I_ref2, the source will stabilise at its new power output (eg. the speed of the engine in an engine/generator set will stabilise at its new, lower speed).

In this mode of operation, the source is protected by the converter 12 which limits the maximum current drawn from the source. When the source current increases to a value which is considered optimal (for example, when the output current of an engine/generator set reaches a value representative of the optimum torque output of the engine) the current limiting function described with reference to the voltage control scheme can be brought into operation. Subsequent increase in load demand will starve the intermediate DC output of power, resulting in a corresponding fall in the intermediate DC output voltage VDC.

In both of the above described control schemes, the use of the decoupling converter 12 can be seen to be extremely important, enabling the use of variable electrical sources with quite different characteristics.

Numerous variations and modifications of the basic apparatus described above are possible.

For example, it is possible to utilise two or more auxiliary energy sources in the place of the energy storage device 28, to provide a system which responds more effectively to both short and long term peak loads (see below). In some other cases, supplementary energy storage may be excluded. Instead, a load anticipation circuit can be introduced to cope with high impact or large step loads. In FIG. 3, apparatus corresponding essentially to that of FIG. 1 is shown, wherein the internal load 14 comprises a DC to AC converter (ie. an inverter) which is arranged to supply to an AC electrical output to main load 30. In addition, a second, onerous auxiliary load 32 is catered for, which load is expected to cause transient or temporary overload in operation. This load is fed from the inverter 14 via an interface circuit 34 and a current sensor 36 which provides an output current signal I_4 to a controller 38 related to the magnitude of the load current. The controller 38 controls the operation of the interface circuit 34.

On detecting a load, the interface circuit 34 rapidly disconnects the load from the inverter 14 or reduces the frequency and/or voltage of the output to the load. The controller 38 generates an output signal Va2x which is applied to the control loop 24 to cause the source 10 to generate maximum output power (in the case of an engine/generator set the engine is accelerated to a maximum speed). A momentary sub-load condition occurs and the normal load adaptive power control loop is temporarily overridden. When the interface controller 38 detects from the output V_2 of the second voltage sensor 20 that the output of the source 10 is at a maximum, the controller 38 outputs a control signal V_ali to the interface 34, connecting the auxiliary load 32 to the inverter 14 according to predetermined characteristics of the interface (eg. on/off, variable voltage/frequency or soft start). After the momentary override, the normal load adaptive control system will resume operating and the power output of the source 10 will be stabilised so that the output power thereof and the total load demand are in balance.

By way of example, if the auxiliary load is a DC shunt motor, then the interface will apply voltage to the shunt winding, and then ramp the voltage up on the armature circuit to its nominal operating value. If the auxiliary load is an AC motor, then the interface can either reduce the applied voltage as in a soft start circuit, or reduce the voltage and frequency proportionally, as in an adjustable speed drive (ASD). The auxiliary load can also simply be disconnected and reconnected when the source has reached its maximum output power level.

FIG. 4 shows a similar arrangement to that of FIG. 3 (identical components are omitted to avoid repetition) except that the internal load 14 is a DC to DC converter which supplies a main DC load 40. An auxiliary load 42 (DC or AC) is supplied via an interface 44 and the current sensor 36 directly from the intermediate DC output of the apparatus.

In FIG. 5, a variation of the apparatus is shown which corresponds substantially to the embodiment of FIG. 1 but in which a second, supplementary energy storage device 46 is provided. In this arrangement, the energy storage devices 28 and 46 will typically comprise one or more capacitors or ultra-capacitors. Instead, particularly in the case of the second energy storage device 46, where duty cycles are less onerous, a battery or another device such as a flywheel motor/generator could be employed. The capacitor(s) 46 are connected to the intermediate DC output via a second DC to DC converter 48 with its own associated measurement and control circuit 50. The control circuit 50 receives the output $V_{-1}$ from the first voltage sensor 18, corresponding to the value of VDC, as well as an output V_3 of a third voltage sensor 52, corresponding to the terminal voltage of the energy storage device 46, and an output I_3 from a current sensor 54 corresponding the to magnitude of the current between the supplementary energy storage device and the converter 48.

The measurement and control circuit 50 is arranged to control the converter 48 to feed energy from the second energy storage device 46 into the intermediate DC output when the value of VDC falls below a second threshold which is marginally lower than the first threshold determined by the reference voltage V_ref1. Thus, in the case of a sharp increase in the power demand of the load, the value of VDC drops below the second threshold and additional energy from the capacitors 46 is fed to the load, effectively in parallel with the energy supplied by the capacitors 28 and the main decoupling converter 12.

In order to accommodate capacitors, which are variable voltage devices (ie. the terminal voltage of a capacitor varies according to its state of charge) the DC to DC converter 48 can operate as both as a step-up or step-down variable ratio converter (depending on the working voltage of the capacitors) as required, so that it delivers an output to the intermediate DC output with a voltage which is nominally equal to VDC. This arrangement allows auxiliary energy sources having substantially different characteristics (eg. higher or lower operating voltages) to be used in parallel.

In FIG. 6, a similar arrangement to that of FIG. 5 is shown, but with a third, reserve energy storage device in the form of a battery 56 being included. In this case, the energy storage devices 28 and 46 are both banks of capacitors. In this arrangement, the battery 56 is arranged to be charged from an energy source 58 which could be derived from the main source 10 or which could be, for example, an auxiliary mains source, a solar panel or another energy source. The output of the source 58 is fed to a converter 60, the characteristics of which are determined by the nature of the source 58. The output of the converter 60 is fed via a current sensor 62 to the battery 56 and its operation is controlled by a measurement and control circuit 64 which is responsive to the output of the current sensor 62, a voltage sensor 66, and current and voltage reference signals V_ref4 and I_ref4.

The battery 56 is connected via an interface circuit 68 to the input of the DC to DC converter 48, which connection point is effectively a second intermediate DC output of the apparatus, isolated or decoupled from the main intermediate DC output by the converter 48.

It will be appreciated that the above described embodiment of the invention, which uses multiple controllable electrical sources, represents a hybrid generator system which can supply one or more loads from two or more different sources, according to a predetermined control scheme. Thus, the present invention provides great flexibility in designing hybrid generator systems for specific applications.

In the illustrated arrangement, the first energy storage device 28 discharges into the load 14 when the value of VDC drops due to increase load demand. When the value of VDC drops further, below the first voltage threshold, the power control loop is activated as described above with references to FIG. 1. The second energy storage device 46 discharges energy into the intermediate DC output when the value of VDC falls below a second voltage threshold, below the first threshold. The third energy source (the reserve battery 56) discharges when the voltage V_3 measured at the output of the second energy storage device 46 falls below the terminal voltage of the battery 56.

Although the battery 56 could be arranged to deliver power to the intermediate DC output once the value of VDC had fallen below a third threshold, below the second threshold, it is important to realise that the control circuit for the reserve battery can be arranged to supply power via the interface 68 at any desired point, independent of the first and second predetermined thresholds. This flexibility is a particular advantage of the present invention.

In the arrangement of FIG. 6, the battery 56 will typically be used to supply the load relatively infrequently compared with the banks of capacitors 28 and 46. This is desirable, since the duty cycle of the battery is then dramatically reduced, while capacitors can survive a much greater number of charge/discharge cycles relative to batteries. Therefore, this arrangement provides the apparatus with substantial flexibility and reserve energy capacity, while enhancing the reliability and longevity of the system.

Instead of capacitors or a battery, other types of energy storage device such as a flywheel motor/generator arrangement could be used instead. The important criterion, apart from utilising appropriate interfaces, is to match the type of energy storage device selected with both the transient and long term energy demands which must be met by the auxiliary storage devices.

Referring now to FIG. 7a, a more detailed block diagram of an embodiment of the invention shown. This embodiment utilises an engine/generator as the controllable electrical power source 10. The engine 70 used in the prototype was a diesel engine with fuel injection, while the generator 72 was an AC permanent magnet three phase generator. The engine is controlled by a fuel injection controller 74 which responds to electrical control signals from an engine speed controller circuit 76. The AC output of the generator 72 is applied to a three phase rectifier circuit 78 and thence to an LC filter 80 before being applied to the input of a DC to DC converter 82 (corresponding to the decoupling converter 12 of the previous figures). The converter operates as a step-up chopper. The output of the generator 72 will vary both in voltage and frequency according to the speed of the engine 70, and the DC to DC converter 82 converts this variable voltage output to the intermediate DC output which is used to power the internal load 14 (typically an inverter) which in turn powers an external load 84. As described above, the DC to DC converter 82 effectively decouples or isolates the generator/rectifier output, which varies substantially with the speed of the engine 70, from the intermediate DC output.

The control circuit of the apparatus includes a voltage control circuit 86 which is fed with a main reference input voltage Vr10v from a reference voltage function generator 88 and a second input voltage Va8 from a voltage sensor 90 which corresponds to the value of VDC (ie the voltage at the intermediate DC output). The value of Va8 reflects variations in the value of VDC due to variations in the magnitude of the applied load. The voltage control circuit 86 essentially functions as a regulator, comparing the measured value of VDC with the main reference voltage Vr10v. In the case of load operating conditions, corresponding to low speed operation of the engine/generator, the voltage drop in the load converter 14 is lower and the main reference input voltage Vr10v is reduced by the function generator 88, thereby improving the partial-load efficiency of the apparatus.

The DC to DC converter 82 has a current/voltage converter control circuit 92 which also receives the output Va8 of the voltage sensor 90 as well as a reference current signal Vr9i from a reference current function generator 94 and a voltage reference signal Vr9v. In addition, the current/voltage controller 92 is fed with an input signal Va5 which is derived from the magnitude from the current supplied from the rectifier 80 to the DC to DC converter 82. The voltage control circuit 86 generates a reference speed signal Vr1I in response to the measured variation in VDC, which is applied to the engine speed controller 76 together with an output signal Va2 from the speed sensor 96. The speed controller 76 generates an output signal Vr12 which is applied to the fuel injection controller 74 to vary the speed of the engine 70.

The speed signal Va2 is also applied to the reference current function generator 94 which modifies the reference current signal Vr9i as a function of the speed to correspond to the engine's torque/speed characteristic. In permanent magnet generators, when the output voltage varies linearly with speed, the generator current corresponds to that engine torque. Consequently, the current/voltage controller 92 controls the converter 82 so that it customises the loading on the engine 70 according to its torque/speed characteristic and thereby optomises its performance over a wide range of varying loads.

When the magnitude of the load 84 increases and as a result the voltage signal Va8 has a value which is less than that of the reference voltage Vr10v, the speed control threshold, the voltage control circuit 86 increases the value of the output signal Vr11 so that the engine speed increases. The current/voltage controller 92 adjusts the operation of the DC to DC converter 82 so that the generator output current is equal to the value set by the reference current signal Vr9i. But, as the generator voltage and hence the input power to the converter 82 increases with speed, the corresponding increase in power delivered to the intermediate DC output will cause an increase in the value of VDC. Stability will occur when the value of Va8 equals that of Vr10v. Conversely, went the voltage signal Va8 (corresponding to the variation in the value of VDC) is greater than the reference voltage Vr10v, the engine speed is decreased. If the engine reaches its minimum operating speed and the value of VDC remains greater than the reference voltage signal Vr9v (which is marginally greater in magnitude than Vr10v) the current/voltage controller 92 will operate the DC to DC converter 82 to reduce its output, so that the current signal Va5 is reduced until the value of VDC is equal to the reference voltage Vr9v.

In addition to the primary energy storage device (capacitor) 28, the apparatus includes auxiliary energy storage devices comprising a capacitor C3 and a battery BAT. The battery is isolated from the capacitor by a diode D6 and effectively forms a hybrid battery in parallel with the capacitor. The battery voltage Vbat is substantially lower than the capacitor voltage Vc3 so that the capacitor C3 can deliver a substantial amount of power into the load as it discharges, with its terminal voltage dropping from a relatively high, fully charged voltage to a value which eventually reaches the terminal voltage Vbat of the battery. When the capacitor terminal voltage is equal to the value of Vbat, the battery takes over the power delivery function as it supplies energy through the diode D6, via a charge/discharge converter 98, to the intermediate DC output.

The charge/discharge converter 98 comprises a pair of transistors T2 and T3, together with diodes D2 and D3 and a choke L3. The transistor T3 and the diode D3 are controlled by a charge controller 100 and function in conjunction with the choke L3 as a step-down chopper to charge the capacitor C3 from the intermediate DC output. The transistor T2 and the diode D2 are controlled by a discharge controller 102 and function as a step-up chopped in conjunction with the choke L3 to control the discharge of the capacitor C3 into the intermediate DC output. The reserve battery BAT also discharges into the intermediate DC output via the step-up chopper comprising the transistor T2, the diode D2 and the choke L3.

The discharge controller 102 functions according to the value of the predetermined voltage thresholds of the intermediate DC output and the relevant discharge current feedback signal Ises provided by a current sensor 118, as described above.

The charge controller 100 operates in response to a charge enable signal V21 from a comparator 119 when the intermediate DC output voltage signal Va8 exceeds the charge enable voltage reference Vr19vb, marginally higher than Vr18v. It operates, inter alia, according to the output of a capacitor reference current function generator circuit 104 which modifies the reference current signal as a function of the speed feedback signal Va2 from the speed sensor 96 to optomise the charging of the capacitor C3 according to the engine speed and available power.

Due to the presence of the blocking diode D5 the reserve battery BAT can only be discharged (and not charged) via the charge/discharge converter 98. Therefore, an additionally charging converter 106 comprising a transistor T4, a diode D4 and a choke L4 is provided for the purpose of charging the battery. The converter 106 is controlled by a charger controller 108 and operates as a step-down chopper to charge the battery according to a feedback battery voltage signal Vbat from a battery voltage reference signal Vbat.ref and a charging current reference signal Ibat.ref. The latter reference signals are generated by battery reference voltage and battery reference current function generators 112 and 114, respectively. A filter comprising a capacitor C5 and an inducer L5 smooths the output of the charge converter 106 to prevent damage to the battery as a result of high ripple voltage/current.

The battery reference voltage function generator 112 modifies the battery reference voltage signal Vbat.ref according the battery temperature so as to prevent gassing during charging. The battery reference current function generator modifies the battery reference current signal Ibat.ref according to the speed feedback signal Va2 to optomise battery charging with respect to the available power.

In the illustrated example, energy for the battery charge converter 106 is derived from the intermediate DC output, but it will be appreciated that an independent power source could be utilised to charge the battery BAT, for example, solar panels.

Because the control circuitry of the charge/discharge converter 98 can operate almost instantaneously on detecting a drop in the value of VDC due to a sudden increase in the magnitude of the load (ie. a temporary overload condition) it is not necessary for the engine 70 to be run at an inefficiently high speed to cope with such demands. Instead, the auxiliary energy sources can provide sufficient energy to meet the peak load demand until the engine speed can increase sufficiently to supply the load fully. Thus, the described embodiment of the invention effectively comprises a fast acting short term energy source operating in parallel with the variable speed, variable output generator set.

FIG. 7b shows the interrelationship between various reference voltages and operating threshold voltages in the circuit of FIG. 7a. When the voltage VDC of the intermediate DC output, corresponding to the signal Va8 from the voltage sensor 90, drops below the second threshold voltage Vr18v, the converter 98 will pump current from the capacitor C3 into the intermediate DC output to maintain the value thereof at the second threshold voltage Vr18v, irrespective of the falling terminal voltage of the capacitor C3. This terminal voltage Vses is the input voltage of a voltage monitor 116, which provides an output to the charge controller 100. The capacitor discharge current Ises is obtained from a current sensor 118 and is also fed to the charge controller 100 as well as to the discharge controller 102.

The discharge controller 102 limits the discharge current according to a reference current value Vr18i in order to protect the converter 98 against overload and the capacitor C3 and the battery BAT against excessive discharge rates.

Discharging via the converter 98 is disables by the discharge controller 102 when a voltage Vses of the capacitor C3 falls below a third threshold to a level indicative of a poor state of charge of the battery BAT. The battery protection means is omitted for simplicity in FIG. 7a. However, there is no direct control of the discharge of the battery BAT. When the terminal voltage of the capacitor C3 falls below that of the reserve battery BAT, current is fed from the battery via the diode D5 to the capacitor C3 and thence via the converter 98 to the intermediate DC output. Because of the voltage drop across the diode D5, the voltage across the capacitor C3 will stablise at the third threshold, below the second threshold. This voltage level will depend on the discharge-voltage characteristic of the reserve battery as it takes over the power delivery function from the capacitor C3.

Although conventional wisdom might suggest that placing a DC to DC converter between the output of a generator and a load would reduce the efficiency of the apparatus, due to the less than 100% efficiency of the converter, in fact a beneficial result is obtained. The effect of placing the DC to DC converter between the generator/rectifier and the load is to "decouple" or isolate the generator output from the intermediate DC output of the system, enabling the system to cope with a much wider range of engine/generator speeds while still operating efficiently. Thus, the apparatus of the invention can operate efficiently even when the lightly loaded, compared with prior art systems which cannot supply a light load efficiently from the engine/generator, and instead must use a battery for this purpose. The cost penalty arising from the losses in the converter is negligible when compared with the gain in fuel efficiency and overall electrical output efficiency of the apparatus of the invention.

FIGS. 8a to 8c to 9a to 9c are graphs illustrating the principle of operation of the speed/power control system of FIG. 7.

In FIG. 8a, the generator output power is shown as a function of the engine speed. "A" is the minimum speed operating point and "B" the maximum speed operating point. Both A and B are points of constant speed operation. Between points A and B, the engine operates in a variable speed mode. The upper line (dotted) shows the maximum power/speed characteristic of the engine and the lower line shows the desired load power curve which is always below the engine's maximum power source so that there is reserve power for acceleration at any given moment.

At the point of maximum speed operation (A) the load power is permitted to increase until point 1 (see FIG. 8a). As the load increases further, the engine is caused to accelerate until it reaches its maximum operating speed point 2. In this constant speed operating mode, the load power is then permitted to increase until the maximum engine power rating (3) is reached.

The use of the controllable decoupling converter between the generator and the intermediate DC output of the system provides the opportunity of controlling the load on the engine in the variable speed region between points 1 and 2 according to the desired curve, including the limits at the minimum and maximum speed operating points A and B. Control is effected by controlling the current drawn form the generator according to a desired reference current characteristic curve. FIG. 8c shows the substantially linear voltage/ speed characteristic of a permanent magnet generator. Given that the generator load power is represented by the product of the generator's rectified DC voltage and DC current output, it follows that with the voltage characteristic as a given, the reference current curve can be calculated to produce a load power which would match the desired power curve between points 1 and 2 in FIG. 8a.

In FIG. 8b, the upper line depicts the current which, when multiplied by the voltage shown in FIG. 8c, produces the engine maximum power characteristic curve shown by the upper line in FIG. 8a. The current is proportional to the torque on the engine. Similarly, the lower line in FIG. 8b depicts the current required to produce the load power characteristic depicted by the lower line in FIG. 8a. It can be noted how, in the minimum operating speed mode, the generator current is permitted to increase until point 1. Between points 1 and 2, the generator current is controlled so that the desired power characteristic is produced. In the maximum constant operating speed mode at point B, the current is again permitted to increase until point 3, representing the current which together with the corresponding voltage in FIG. 8c produces the maximum power rating of the engine (corresponding to point 3 in FIG. 8a).

FIGS. 9a and 9c show the voltage, current and speed, respectively, of the generator as a function of load power. The curves of FIGS. 9a and 9c are similar because of the permanent magnet generator's linear voltage/speed characteristics. In the constant speed mode, the voltage remains constant. As the load is increased and exceeds the value at point A, the engine speed is caused to increase between points 1 and 2 so that the engine can cope with the increased load. Point B depicts the maximum constant speed, so that the speed and voltage remain constant between points 2 and 3.

In FIG. 9b, the generator output current which is required to produce the required speed/load power characteristics is shown. The load current is permitted to increase linearly until point 1. Between points 1 and 2, the current is controlled as shown so that the desired speed/power characteristic is obtained. When the load increases further, the current is once again permitted to increase in the constant speed cooperating mode until the maximum engine power rating if reached at point 3.

The above figures show a relatively simple control scheme for optomising the operating of an engine according to its performance characteristics such as power versus speed, the derating factors, etc. The engine speed is varied between a minimum operating speed and a maximum operating speed so that its loading will follow an optimum power/speed curve which is determined from the engine's performance curves, always allowing some reserve capacity for acceleration when the load is increased.

With the power/speed characteristic of the engine as a given and taking into account the fact that the output voltage of a permanent magnet generator varies linearly with speed, relatively simple control of the current according to the characteristic curve (see FIGS. 8b and 9b) will ensure that the engine operates under optimal conditions as the load varies with time and the engine speed is caused to vary according to the power/speed relationships shown in FIGS. 8a and 9a.

In a simplified control scheme, the current can simply be regulated to remain constant while the engine operates in its variable speed operating region. In this case, the current/ speed curve in FIG. 8b will be a simple horizontal line between points one and two, while the power/speed curve in FIG. 9a will follow the voltage curve in FIG. 9c. If the power/speed characteristic of the engine deviates substantially from a straight line, it will be appreciated that the engine will at times operate in a sub-optimally loaded condition, even though the speed is varied as a function of the load. However, in many cases, such as a simplified control scheme may be perfectly appreciable.

FIG. 10 shows a variation of the control loop used in the arrangement of FIG. 1, which is required in cases where the voltage characteristic of the power source is not linear as shown in FIGS. 8 and 9. A speed sensor 120 generates a speed output signal Va2 which is fed to a power function generator 122 which generates a corresponding output signal P representative of the output power of the source 10 (ie. the power v speed characteristic of the engine driving a generator). This signal, together with the signal V_2 from the voltage sensor 20, is applied to a divider circuit 124 which generates the reference current signal I_ref2 which is fed to the measurement and control circuit 16. The divider 124 effectively divides the power/speed characteristic curve P by the voltage signal V_2 in real time to provide the DC to DC converter with a modified current reference signal which will produce a desired reference power curve corresponding to FIG. 9a.

Similarly, in FIG. 11, the current control scheme of FIG. 2 is modified by feeding the output Va2 of the speed sensor 120 into a power function generator 122, the output P of which is divided by the voltage signal V_2 in the divider circuit 125 to generate a modified current reference signal Iref_2x in order to produce the desired reference power curve.

FIGS. 12, 13 and 14 show circuits which can be used to enhance the operation of the described apparatus. In FIG. 12, an atmospheric temperature sensor 128 and an atmospheric pressure sensor 130 are provided, the outputs of which are fed to respective function generator circuits 132 and 134. The temperature sensor 128 monitors the temperature of the air as it enters the engine, and the output signal Kder1 of the function generator 132 is proportional to the engine derating characteristic for high ambient temperature operation. Similarly, the pressure sensor 130 monitors the air pressure at the air intake of the engine and provides a pressure signal to the ambient pressure function generator 134 which produces an output signal Ader1 proportional to the engine's derating characteristic for high altitude operation. A torque reference signal R is produced by a torque function generator 136 from an engine speed signal Va2 provided by an engine speed sensor 120, and all three signals are summed in a summation block 138 to product an output current reference I_ref2 proportional to the engine torque/speed characteristic which has been derated for site conditions which deviate from standard reference conditions.

In FIG. 13, a temperature sensor 148 is used to provide an exhaust temperature signal Kex1 which is compared in an exhaust temperature load controller 140 with an engine exhaust temperature/speed-load characteristic signal Kex2 generated by an exhaust temperature function generator 142 from the engine speed signal Va2. The exhaust temperature controller 140 generates an output signal Kex3 related to the deviation of the real exhaust temperature from the reference signal. This error signal Kex3 is summed with the output T of the engine torque/speed function generator 136 in the summation block 128 to generate a corrected current reference signal I_ref2.

The exhaust temperature is a parameter which is proportional to the ambient temperature, pressure (a measure of altitude) load and the general state of health of the engine and the quality of the fuel used. Therefore, by simply monitoring engine exhaust temperature and correcting for variations therein relative to exhaust temperature reference signal, the engine can conveniently be derated by increasing its speed for a given load power demand in order to compensate for conditions such as poor fuel quality, high ambient temperature, high altitude, or poor state of tune the engine.

In FIG. 14, the arrangement of FIG. 13 is extended by generating a second output Kex4 in the function generator 142 which is compared with the real exhaust temperature Kex1 in a second exhaust temperature controller 144, which generates an error signal Kex5. A maximum speed reference signal is summed with the error signal Kex5 in a second summation block 146 to produce an output speed reference signal for the engine speed control circuit. This adds a further control loop, controlling the engine speed according to the exhaust temperature error.

The engine torque reference signal shown in FIGS. 12, 13 and 14 can be replaced with the modified current signal I_ref2 representative of the engine's power/speed characteristic of FIG. 10. It can also be noted that the derating techniques described above with reference to FIGS. 12, 13 and 14 are applicable to both the above described voltage and current control schemes of operation of the apparatus.

With reference now to FIG. 15, an alternative electrical source is shown, comprising a fuel cell stack 150 in place of the engine/generator described above. Where appropriate, similar reference numerals are used to those used in FIG. 1. Conceptually, the arrangement of FIG. 15 is very similar to that of a diesel engine driving a generator under the voltage control scheme of FIG. 1. The decoupling DC to DC converter 12 is controlled by its dedicated control circuit 16, ulitising two reference inputs namely a voltage reference V_1xref which sets the value of VDC of the intermediate DC output and a current reference signal I_2ref, a current reference signal which is modified to match the fuel cell performance characteristic. There are two feedback signals, namely I_2 (representative of the fuel cell output current or converter input current) and V_1 (the voltage in the intermediate DC output).

The DC to DC converter 12 operates in a similar manner to the arrangement of FIG. 1. A main power controller 152 monitors the voltage VDC of the intermediate DC output. When this voltage drops below the reference voltage V_1ref, the controller 152 generates a power reference signal P which activates the main fuel cell controller 24. This is a more complex controller, with the fuel cell performance map programmed into its control software. It monitors the fuel cell output voltage V_2 and current I_2 and generates a current reference signal I_2ref which, via the DC to DC converter and its controller, regulates the supply of power the intermediate DC output according to its optomised performance characteristic and the power demand signal Pref of the main power flow controller 152. Simultaneously, the main fuel cell controller 24 generates a further two output signals namely Oxygen Vol_ref and Fuel Pressure_ref signals. The flow of oxygen/air and the fuel pressure of the parameters that regulate the non-electrical inputs of the fuel cell and hence the output power. Regulation of the fuel pressure and oxygen flow enable the fuel cell to operate efficiently with partial loads or loads which vary in time.

What is claimed is:

1. Power supply apparatus comprising:
    at least one controllable source arranged to provide a variable voltage and/or current electrical output;
    decoupling converter means for generating an intermediate DC output from the variable voltage and/or current electrical output of said at least one controllable source which is substantially independent of variations in the electrical output of the source;
    output means for generating an AC or DC output to supply a time varying load from the intermediate DC output;
    sensor means for monitoring the voltage and/or current of said at least one controllable source and the intermediate DC output and for generating output signals corresponding thereto; and
    control means responsive to the output signals to control the operation of said at least one controllable source, to dynamically vary the power output of the source and thereby to supply the power required by the time varying load.

2. Power supply apparatus according to claim 1 wherein the controllable source comprises a fuel cell, a hydro-electric generator, a wind turbine, a gas turbine/generator or any other device which generates an electrical output from a non-electrical input.

3. Power supply apparatus according to claim 1 wherein the controllable source comprises an engine and a generator which provides a variable voltage output to the decoupling converter means.

4. Power supply apparatus according to claim 3 wherein the generator is an AC generator which provides a variable voltage, variable frequency AC output to the decoupling converter means, the apparatus including rectifier means for rectifying the AC output of the generator and decoupling converter means comprising a DC to DC converter for converting the rectified AC output to an intermediate DC output having a voltage which is controlled with respect to a reference voltage.

5. Power supply apparatus according to claim 4 wherein the control means includes sensor means arranged to monitor the loading of the intermediate DC output of the converter means and/or the controllable source, and to increase the speed of the engine when the loading exceeds a predetermined value.

6. Power supply apparatus according to claim 5 wherein the control means operates to maintain the current drawn from the controllable source at a predetermined level or within a predetermined range, the sensor means comprising a voltage sensor arranged to monitor the output voltage at the intermediate DC output of the converter means, and to increase the speed of the engine to increase the power supplied to the converter means when the voltage of the intermediate DC output drops below a first voltage threshold.

7. Power supply apparatus according to claim 5 wherein the control means operates to maintain the voltage of the intermediate DC output substantially constant, the sensor means comprising a current sensor arranged to monitor the current drawn from the controllable source and to increase the speed of the engine to increase the power supplied to the converter means when the current drawn from the controllable source exceeds a first current threshold.

8. Power supply apparatus according to claim 6 including at least first energy storage means arranged to be charged from the intermediate DC output and to discharge energy into the intermediate DC output when the voltage of the intermediate DC output falls below a nominal value.

9. Power supply apparatus according to claim 1 including auxiliary control means arranged to detect the connection of an onerous auxiliary load to the output means and to control the supply of power to the auxiliary load, thereby to prevent excessive loading of the output means.

10. Power supply apparatus according to claim 8 including at least second energy storage means, a charge circuit arranged to charge the second energy storage means from the intermediate DC output of the converter means, and a discharge circuit arranged to discharge the second energy storage means in parallel with the first energy storage means when the intermediate DC output voltage drops below a second voltage threshold below the first voltage threshold.

11. Power supply apparatus according to claim 10 including third energy storage means, a charge circuit arranged to charge the third energy storage means from an electrical source, and auxiliary converter means arranged to discharge the third energy storage means in parallel with the first and second energy storage means after the second energy storage means has discharged at least partially.

12. Power supply apparatus according to claim 11 wherein the first and second energy source devices are capacitors and the third energy storage device is a battery.

13. Power supply apparatus according to claim 4 including a speed sensor for monitoring the speed of the engine/generator and for generating a speed output signal related thereto, and function generator means for generating a power signal from the speed output signal, the power signal being representative of a power/speed characteristic of the engine and being utilized by the control means to optomise the operation of the engine.

14. Power supply apparatus according to claim 13 including ambient pressure and temperature sensors for monitoring ambient pressure and temperature and for generating respective pressure and temperature output signals, and further including respective pressure and temperature function generators for generating outputs comprising engine derating characteristics to compensate for variations in ambient operating pressure and temperature.

15. Power supply apparatus according to claim 13 including an exhaust temperature sensor arranged to monitor the engine exhaust temperature and to generate an exhaust temperature output signal, an exhaust temperature function generator for generating an exhaust temperature/speed-load characteristic signal from the speed output signal, and a controller for generating an error signal from the difference between the exhaust temperature output signal and the exhaust temperature/speed-load characteristic signal, thereby to compensate for factors affecting the engine exhaust temperature.

* * * * *

UNITED STATES PATENT AND TRADEMARK OFFICE
CERTIFICATE OF CORRECTION

PATENT NO. : 6,175,217 B1
DATED : January 16, 2001
INVENTOR(S) : Manuel dos Santos da Ponte et al.

It is certified that error appears in the above-identified patent and that said Letters Patent is hereby corrected as shown below:

Column 5,
Line 33, delete "recharged" and insert -- recharges --.

Column 6,
Line 65, after the word "supply", delete the word "to".

Column 7,
Line 57, delete "$V_1$" and insert -- $V\_1$ --.
Line 61, delete "the to" and insert -- to the --.

Column 9,
Line 16, after the word "invention" insert the word -- is --.
Line 47, before the word "load" insert the word -- low --.
Line 62, delete the word "Vr1l" and insert the word -- Vr11 --.
Line 65, delete the word "Vrl2" and insert the word -- Vr12 --.

Column 10,
Line 6, after the words "corresponds to", delete the word "that" and insert the word -- the --.
Line 10, delete the word "optomises" and insert the word -- optimises --.
Line 57, delete the words "step-up chopped" and insert the words -- step-up chopper --.

Column 11,
Line 9, delete the word "optomise" and insert the word -- optimise --.
Line 19, between the words "voltage" and "reference" insert the words -- monitor 110, a feedback battery current signal Ibat, a battery voltage --.
Line 29, after the word "according" Applicants request the insertion of the word -- to --.
Line 33, delete the word "optomise" and insert the word -- optimise --.

Column 12,
Line 5, delete the word "disables" and insert the word -- disabled --.
Line 6, after the word "when", delete the word "a" and insert the word -- the -- .
Line 31, delete the word "the".
Line 52, delete the word "maximum" and insert the word -- minimum --.
Line 65, delete the word "form" and insert the word -- from --.

Column 13,
Line 24, delete the word "and" and insert the word -- to --.
Line 43, delete the word "cooperating" and insert the word -- operating --.
Line 43, delete the word "if" and insert the word -- is --.
Line 46, delete the word "optomise" and insert the word -- optimise --.
Line 46, delete the word "operating" and insert the word -- operation --.

UNITED STATES PATENT AND TRADEMARK OFFICE
CERTIFICATE OF CORRECTION

PATENT NO.   : 6,175,217 B1
DATED        : January 16, 2001
INVENTOR(S)  : Manuel dos Santos da Ponte et al.

It is certified that error appears in the above-identified patent and that said Letters Patent is hereby corrected as shown below:

Column 13, cont'd,
Line 67, Applicants request the deletion of the words "one and two" and insert the numerals -- 1 and 2 --.

Column 14,
Line 7, delete the word "appreciable" and insert the word -- acceptable --.
Line 29, delete the numeral "125" and insert the numeral -- 124 --.
Line 47, delete reference "R" an insert reference -- T --.
Line 64, delete the numeral "128" and insert the numeral -- 138 --.

Column 15,
Line 8, after the word "tune" insert the word -- of --.
Line 35, after the word "inputs", insert -- , --.
Line 47, delete the word "V_1ref" and insert the word -- V_1xref --.
Line 54, before the word "the", Applicants request the insertion of the word -- to --.
Line 54, delete the word "optomised" and insert the word -- optimised --.
Line 59, Applicants request the deletion of the phrase "ref signals. The", and insertion of the phrase -- ref signals, the --.

Column 16,
Line 29, before the word "decoupling" insert the word -- the --.
Line 64, after the word "auxiliary" insert the word -- load --.

Column 17,
Line 17, delete the word "source" and insert the word -- storage --.

Column 18,
Line 1, delete the word "optomise" and insert the word -- optimise --.

Signed and Sealed this

Twenty-ninth Day of January, 2002

*Attest:*

*Attesting Officer*

JAMES E. ROGAN
*Director of the United States Patent and Trademark Office*